W. O. STOUT.
CAMERA.
APPLICATION FILED NOV. 7, 1914.
1,364,462. Patented Jan. 4, 1921.
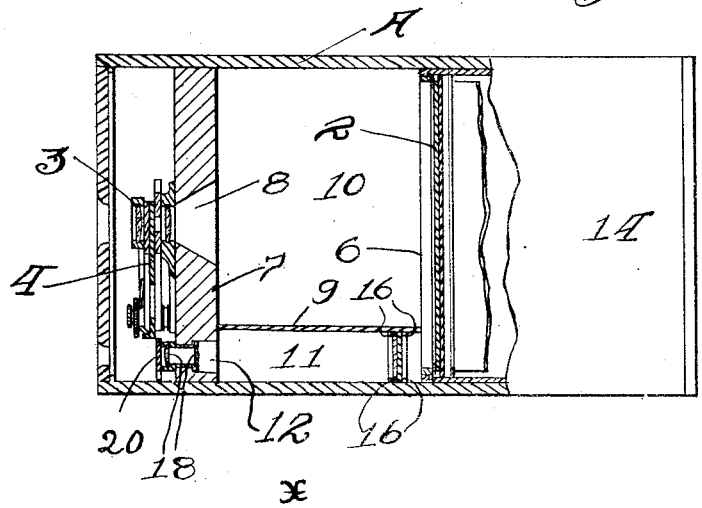
Fig. 2.
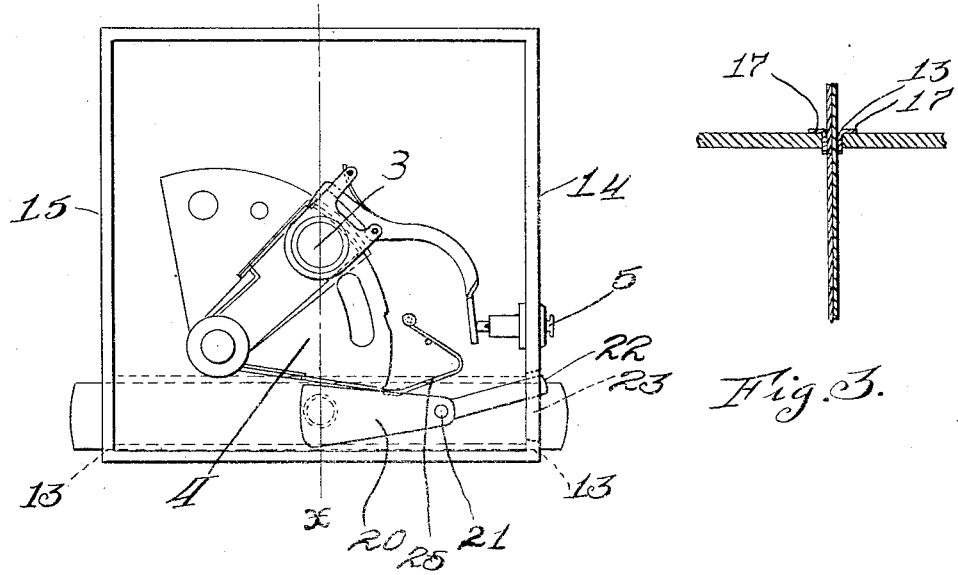
Fig. 1.
Fig. 3.
Witnesses:
Inventor:
Wilfred Oakley Stout.
by:
Attorney.

UNITED STATES PATENT OFFICE.

WILFRED OAKLEY STOUT, OF ST. PAUL, MINNESOTA.

CAMERA.

1,364,462.  Specification of Letters Patent.  Patented Jan. 4, 1921.

Application filed November 7, 1914. Serial No. 870,798.

*To all whom it may concern:*

Be it known that I, WILFRED OAKLEY STOUT, a citizen of the United States, residing at St. Paul, in the county of Ramsey and State of Minnesota, have invented a new and useful Improvement in Cameras, of which the following is a specification.

The object of this invention is to provide a simple and inexpensive means for recording upon a film or sensitized medium at approximately the time of a photographic exposure, an autographic identification, whereby the film or sensitized medium after being developed is made to disclose a permanent record identifying the picture which is produced. More particularly this invention employs a recording slide upon which can be written the name or other identification data, a slip or slips being insertible in a camera in position to record upon the film or sensitized medium which is positioned to be exposed, so that when properly exposed, a photograph is made upon the film or sensitized medium of the identification data previously inscribed upon the slip. To these ends my invention comprises the features of construction and combination of parts, which are hereinafter described and pointed out in the claims.

In the accompanying drawing forming part of this specification, Figure 1 is a front elevation of a camera, equipped with my invention and with the protecting plate removed; Fig. 2 is a side elevation partly in section, the section being taken on the line X—X of Fig. 1, and Fig. 3 is a detail in section of part of the invention.

My invention is applicable to any style of camera, the construction of camera disclosed in the drawing merely illustrating one of many forms in which the invention can be used. A indicates a suitable camera casing, in which the film, plate or other sensitized medium 2 is supported back of the double lense 3 in the usual manner. A shutter 4 of usual form is shown in connection with the lense, said shutter being operable through the use of a push piece 5 or by any ordinary means. The film 2 can be moved in the usual manner to position a fresh portion back of the lens and produce a series of photographs thereon, these features all being in common ordinary use. The holder 6 for the film may be for use for holding a sensitized plate, as well as for a strip of film. Extending longitudinally between the holder and the front wall 7 of the camera in which the exposure aperture 8 is formed, a wall 9 is placed, said wall serving to divide the interior of the camera into two compartments 10 and 11, the compartment 11 being auxiliary to the compartment 10, and serving to confine a certain portion of the photographic film or sensitized medium 2 for use in photographing an autograph or other identification data thereon. The front wall 7 adjacent the auxiliary compartment 11 is provided with an exposure aperture 12, through which light is admitted for photographing upon the portion of the film or sensitized medium, which registers with the compartment 11. Insertible across the compartment 11 through apertures 13 in the side walls 14 and 15 of the camera are two substantially transparent thin slides or strips made of celluloid or other suitable material, a pair of guides 16 being provided for holding the side edges of said strips and assisting in guiding the strips across the auxiliary compartment in front of the sensitized medium. The ends of these strips are left projecting sufficiently so that they can be grasped easily and manipulated. Upon the face of one of these strips the name or other identification data can be inscribed by the use of a pencil, pen and ink or other suitable means, for the purpose of photographing a record identifying the picture which is afterward developed. The remaining strip is placed flat against the face upon which the data is inscribed on the opposite strip, so that the one strip becomes a protection to the face of the strip bearing the inscription and prevents the inscription being rubbed or blurred as the strips are inserted into or withdrawn from the camera. It is not necessary to employ both strips, although the protecting strip under certain conditions serves a useful function. The apertures 13 through which the strips are passed are made light tight by the employment of resilient lining pieces 17 made of felt or any other suitable material closing together, it being obvious, that various constructions can be devised or used for rendering the apertures light tight, while the strips are being inserted, and withdrawn from the camera. The exposure aperture 12 can when desired be provided with a double lens such as 18. A shutter is employed in front of the lens 18, consisting of a plate 20 swinging over the lens to close the opening 12, and adapted to be moved into open position to make an exposure of sufficient time and photograph the inscription on the strip. The plate 20 is journaled by the pin 21 passing into the frame of the camera, and carries an arm 22 extending through an opening 23 in the side wall 14, said arm 22 forming a lever by which the shutter 20 can be manipulated. A spring 25 bears down upon the shutter, and tends to hold it in closed position, but permits the shutter to be moved into open position against its tension. The construction disclosed may be variously modified within the spirit of my invention, it being obvious that various means may be designed for manipulating a shutter over the auxiliary lens, either simultaneously with the exposure made through the main lens of the camera at the time a picture is taken, or independent of the operation of the main portion of the camera as desired. Any form of shutter may also be applied to the lens 18 or opening 12, whereby an instantaneous or time exposure can be made by the auxiliary photographing means described.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A camera having a removable long and narrow translucent strip, upon which the record may be initially produced, arranged transversely of the camera adjacent to the focal plane, at one edge of the focal field of the camera and adjoining the sensitized surface of the sensitive element in the camera, a light tight casing for the translucent strip, a shutter for the casing, a spring, which normally closes the shutter, and means whereby the shutter may be opened against the stress of the spring.

2. In a camera, a light tight casing extending transversely thereof, and located in the waste space at one edge of the focal field of the camera, the inner side of which casing is adjacent to the focal plane and adjoins the sensitized side of the sensitive element, an endwise removable translucent strip adapted to slide within the casing adjacent to the film, an automatically closing shutter for the casing so constructed and arranged as to simultaneously and co-extensively admit light to the entire interior of the casing, a spring which normally closes the shutter, and means whereby the shutter may be opened against the stress of the spring.

3. In a camera, a light tight casing located in the usually waste space between the edge of the focal field and the adjacent wall of the camera, said casing having a controllable exposure opening and within which casing a sensitized photographic element may be protected from the light and held in position for exposure, a long and narrow translucent strip, upon which the record may be initially produced, and through which light may be transmitted to print upon the sensitized element thus positioned, said strip being adapted to slide endwise into and out of said casing, and controllable means whereby light may be admitted simultaneously and equally to all parts of the said strip within the chamber, whereby to light print its inscription on the sensitized element.

4. A camera having an autographic attachment embodying a long and narrow removable translucent strip, upon which the record may be initially produced, a slideway for the strip arranged transversely of the camera adjacent to the sensitized surface of the sensitive element, the removable strip being adapted to slide endwise through the slideway, and a spring actuated shutter separate and distinct from the camera lens shutter and which automatically prevents the entrance of light to the strip upon being released and which, when open, simultaneously admits light to all parts of the strip, all of said elements being located wholly within and protected by the outer walls of the body of the camera.

5. A camera having two separate and distinct light tight exposure chambers, both wholly inclosed within the outer walls of the camera, one of them the usual photographic chamber of the camera, the other for printing a record on the sensitive element in the camera, a long and narrow translucent strip, upon which the record may be initially produced, located within the record-making chamber adjacent to the focal plane at one edge of the focal field of the camera and adjoining the sensitized side of the sensitive element, and an automatically closing shutter, which controls the entrance of light to the strip, so constructed and operated that it simultaneously admits light to all parts of the strip.

6. A camera having an autographic attachment embodying a casing located adjacent to the focal plane of the camera and open at opposite sides, a translucent strip, upon which the record may be intially produced, adapted to be introduced through said casing at one of its open sides adjacent to the focal plane and adjoining the sensitized side of the sensitive element, and a shutter adapted to close the opposite open side of the casing and to control the passage of light to the strip, said shutter being so constructed and arranged that when open the strip will be simultaneously illuminated throughout, all of said parts being entirely within the outer surfaces of the camera.

7. In a camera adapted to receive a sensitized photographic element and formed with an opening in its front wall and with a channel communicating with the opening and leading to the said sensitized photographic element, and also having an opening in its side, a normally closed spring-pressed shutter extending over the first-named opening, an inscription receiving screen insertible through the side opening to extend across the inner end of the channel adjacent said sensitized photographic element, and slide-ways registering with the side opening adapted to receive said screen.

In testimony whereof, I have signed my name to this specification in the presence of two subscribing witnesses.

WILFRED OAKLEY STOUT.

Witnesses:
STELLA L. WASCHENBERGER,
F. G. BRADBURY.